(12) United States Patent
Peterschmidt (10) Patent No.: US 7,463,792 B2
(45) Date of Patent: Dec. 9, 2008

(54) SYSTEM AND METHOD OF ARCHIVING FAMILY HISTORY

(76) Inventor: Eric T. Peterschmidt, 2110 Shadyview La. N., Plymouth, MN (US) 55447

( * ) Notice: Subject to any disclaimer, the term of this patent is extended or adjusted under 35 U.S.C. 154(b) by 566 days.

(21) Appl. No.: 11/205,759

(22) Filed: Aug. 17, 2005

(65) Prior Publication Data

US 2006/0039030 A1 Feb. 23, 2006

Related U.S. Application Data

(60) Provisional application No. 60/602,275, filed on Aug. 17, 2004.

(51) Int. Cl.
*G06K 9/52* (2006.01)
(52) U.S. Cl. ...................................... 382/305
(58) Field of Classification Search ................ 382/229, 382/305; 704/E15.019, E15.044; 707/104.1, 707/E17.004, E17.019, E17.02, E17.023, 707/E17.026, E17.028, E17.102, E17.045, 707/E17.054, 1–7; 715/708, 817, 188, FOR. 188
See application file for complete search history.

(56) References Cited

U.S. PATENT DOCUMENTS

| | | | |
|---|---|---|---|
| 6,273,472 B1 | 8/2001 | Pflug | |
| 6,340,978 B1 | 1/2002 | Mindrum | |
| 6,442,748 B1 * | 8/2002 | Bowman-Amuah | 717/108 |
| 6,606,398 B2 | 8/2003 | Cooper | |
| 6,629,104 B1 | 9/2003 | Parulski et al. | |
| 6,745,186 B1 | 6/2004 | Testa et al. | |
| 6,760,731 B2 | 7/2004 | Huff | |
| 6,760,884 B1 | 7/2004 | Vertelney et al. | |
| 6,922,695 B2 * | 7/2005 | Skufca et al. | 707/10 |
| 2001/0031066 A1 * | 10/2001 | Meyer et al. | 382/100 |
| 2001/0041020 A1 | 11/2001 | Shaffer et al. | |
| 2001/0047290 A1 | 11/2001 | Petras et al. | |
| 2002/0087546 A1 | 7/2002 | Slater et al. | |
| 2002/0087601 A1 | 7/2002 | Anderson et al. | |
| 2002/0097259 A1 | 7/2002 | Marshall et al. | |
| 2002/0103813 A1 * | 8/2002 | Frigon | 707/104.1 |
| 2002/0105669 A1 | 8/2002 | Watanabe et al. | |
| 2002/0107829 A1 | 8/2002 | Sigurjonsson et al. | |
| 2002/0128062 A1 | 9/2002 | Pilu | |
| 2002/0143649 A1 | 10/2002 | Wise | |
| 2002/0180803 A1 | 12/2002 | Kaplan et al. | |
| 2002/0184196 A1 | 12/2002 | Lehmeier et al. | |
| 2003/0009461 A1 | 1/2003 | Notargiacomo et al. | |
| 2003/0014422 A1 | 1/2003 | Notargiacomo et al. | |
| 2003/0033296 A1 | 2/2003 | Rothmuller et al. | |

(Continued)

OTHER PUBLICATIONS

Reunion 8, family tree software for Macintosh, www.leisterpro.com.

(Continued)

*Primary Examiner*—Sherali Ishrat
(74) *Attorney, Agent, or Firm*—Kinney & Lange, P.A.

(57) ABSTRACT

Digital media and contextual data relating to the digital media are archived by a system for archiving family history. The system includes a storage medium, a network interface, and a control processor. The storage medium stores the digital media and contextual data. The network interface communicates with a network to send and receive digital media and contextual data. The control processor operates a relational database for organizing the contextual data by arranging the contextual data within contextual tables.

19 Claims, 5 Drawing Sheets

U.S. PATENT DOCUMENTS

| | | |
|---|---|---|
| 2003/0088582 A1 | 5/2003 | Pflug |
| 2003/0151767 A1 | 8/2003 | Habuta et al. |
| 2003/0167264 A1 | 9/2003 | Ogura et al. |
| 2004/0024616 A1 | 2/2004 | Spector et al. |
| 2004/0068521 A1 | 4/2004 | Haacke et al. |
| 2004/0098379 A1 | 5/2004 | Huang |
| 2004/0101212 A1 | 5/2004 | Fedorovskaya et al. |
| 2004/0128697 A1 | 7/2004 | Wood et al. |
| 2004/0139398 A1 | 7/2004 | Testa et al. |
| 2004/0199507 A1 | 10/2004 | Tawa, Jr. |
| 2004/0212700 A1 | 10/2004 | Prabhu et al. |
| 2005/0147947 A1 | 7/2005 | Cookson, Jr. et al. |
| 2005/0149497 A1 | 7/2005 | Cookson, Jr. et al. |
| 2005/0149522 A1 | 7/2005 | Cookson, Jr. et al. |
| 2005/0154706 A1 | 7/2005 | Notargiacomo et al. |

OTHER PUBLICATIONS

"PhotoFinder Project" web site, University of Maryland Human Computer Interaction Laboratory, www.cs.umd.edu/hcil/photolib/.

"Personal Photos Libraries: Innovative Designs a Workshop Agenda with Abstracts", May 29, 2000, University of Maryland Human computer Interaction Laboratory, www.cs.umd.edu/hcil/oldsoh/soh/w3-listwithabstracts.shtml.

"Florida 2000—Story page generated by Photofinder." Includes pictures from a trip to Orlando, FL in the summer of 2000, www.cs.umd.edu/hcil/photolib/Florida2000/.

"Photofinder." www.cs.umd.edu/hcil/photolib/web/.

"A Photo History of SIGCHI: Evolution of Design from Personal to Public", Ben Shneiderman, et al., Interactions, May and Jun. 2002.

"Immediate Usability: A case study of public access design for a community photo library", Bill Kules, et al., University of Maryland, DRAFT Jun. 25, 2004.

"Direct Annotation: A Drag-and-Drop Strategy for Labeling Photos", Ben Shneiderman, et al., University of Maryland.

"Visualization Methods for Personal Photo Collections: Browsing and Searching in the PhotoFinder", Hyunmo Kang, et al., University of Maryland.

* cited by examiner

SYSTEM AND METHOD OF ARCHIVING FAMILY HISTORY

CROSS-REFERENCE TO RELATED APPLICATION(S)

This application claims the benefit of U.S. Provisional Application No. 60/602,275 filed Aug. 17, 2004 for "System and Method for Archiving Family History" by Eric T. Peterschmidt.

INCORPORATION BY REFERENCE

U.S. Provisional Application No. 60/602,275 for "System and Method for Archiving Family History" by Eric T. Peterschmidt is hereby incorporated by reference in its entirety.

BACKGROUND OF THE INVENTION

The present invention relates to data archiving and more particularly to a system and method of archiving family history.

Memories of past generations were previously limited to a few stories or items passed on from one generation to another. Today, however, an increasingly vast array of historical media exists before us. This media takes all forms from photographs, to newspaper clippings, to audio and video recordings. These forms of historical media, many completely unavailable just a century ago, are plentiful. However, much of the historical media is also quickly deteriorating. Photographs, documents, and audio and video recordings can only last for a limited time, and much is being lost each day. In addition, our loved ones, whose memories may be completely undocumented, are also passing away, and with them the stories and memories are being lost as well.

Digital technology has given us a means by which the historical media and memories can be stored and copied without deterioration. In this way, photographs are no longer limited to a single set divided among family members, but rather can now be copied and shared by all. Scanners, digital cameras, digital video cameras, and other analog to digital converters have equipped us with the ability to convert our memories into a digital form. However, people today are overwhelmed by the task. There is too much information to handle, and no convenient way in which it can be stored, accessed, or shared.

BRIEF SUMMARY OF THE INVENTION

The present invention is a system and method for archiving family history. Digital media and contextual data relating to the digital media are archived by a system for archiving family history. The system includes a storage medium, a network interface, and a control processor. The storage medium stores the digital media and contextual data. The network interface communicates with a network to send and receive digital media and contextual data. The control processor operates a relational database for organizing the contextual data by arranging the contextual data within contextual tables.

DETAILED DESCRIPTION

Figure 1:
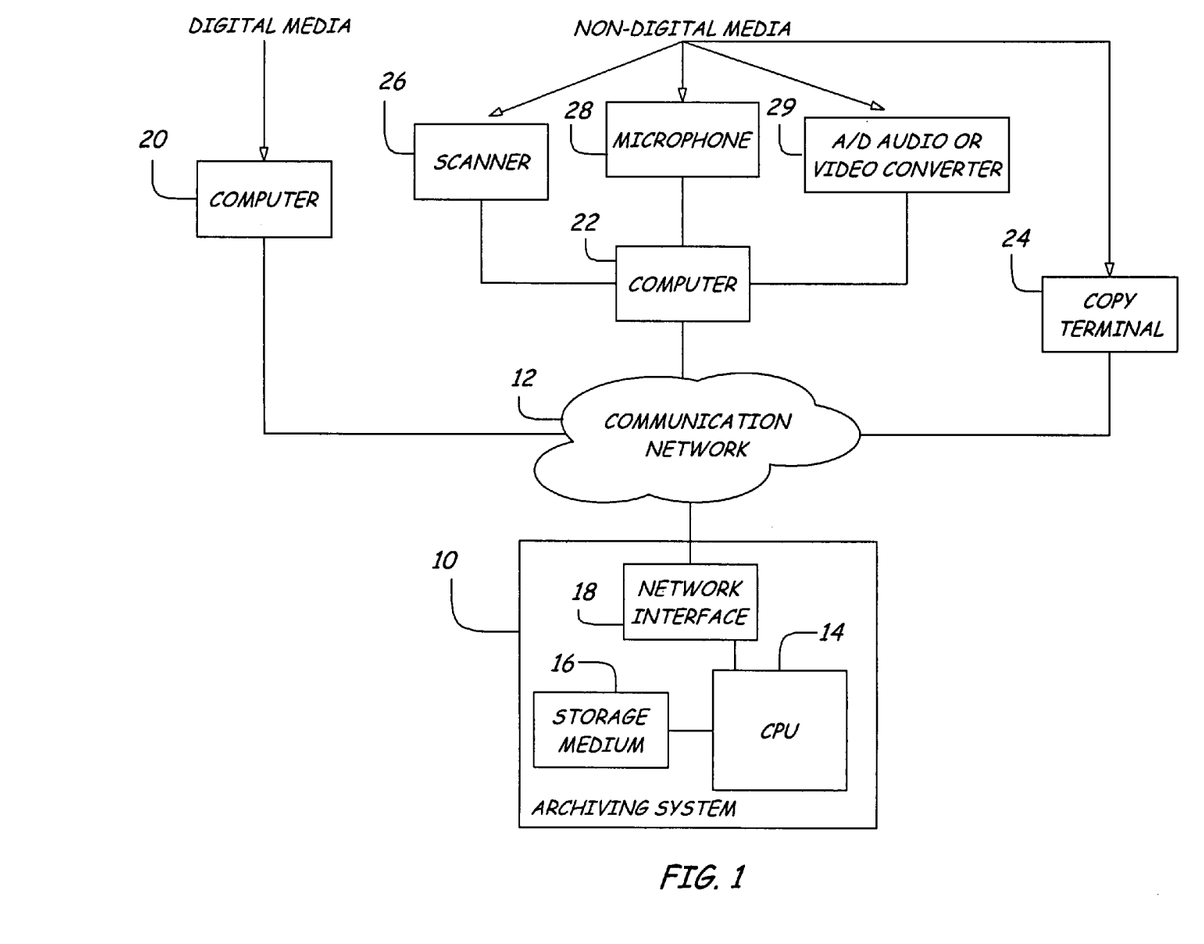
FIG. 1 is a block diagram of the archiving system for archiving family history connected to a network.

FIG. 1 is a block diagram of archiving system 10 for archiving family history connected to communication network 12. Archiving system 10 includes CPU 14, storage medium 16, and network interface 18. Archiving system 10 is, for example, a network-connected server or personal computer. Communication network 12 is, for example, the Internet, an intranet, or any other communication network capable of transferring digital data. Connected to communication network 12 are computers 20 and 22, and copy terminal 24.

Archiving system 10 stores digital media and contextual data related to the digital media on storage medium 16. CPU 14 performs processing functions of archiving system 10. Storage medium 16 is any device capable of storing digital data, such as a hard drive. Network interface 18 handles the communication of data across communication network 12 to send and receive digital media and contextual data relating to the digital media.

Digital media can be input into archiving system 10 by various means. In some cases, media will already exist in a digitized form. In this case, computer 20, already containing digital media, communicates the digital media over communication network 12 to archiving system 10. The digital media is received by network interface 18 of archiving system 10 and stored in storage medium 16.

In other cases, media will not yet exist in a digitized form. In this case, computer 22 or copy terminal 24 are provided. Computer 22 is connected to analog to digital converters including scanner 26, microphone 28, and audio/video converter 29. A photograph or other written or printed medium is digitized by scanner 26 into computer 22. An oral story is spoken into microphone 28 and digitized into computer 22. Analog audio or video recordings are fed into an analog to digital converter to generate a digitized copy in computer 22. The digital media is then transferred over communication network 12 to archiving system 10. The digital media is received by network interface 18 of archiving system 10 and stored in storage medium 16.

Copy terminal 24 is also provided for converting media into a digital form. Copy terminal 24 is a full-service counter or self-service computerized kiosk in which media is digitized and transferred to archiving system 10 over communication network 12. For example, a user who desires to input a photograph into archiving system 10 brings the photograph to copy terminal 24. Copy terminal 24, which includes a scanner and other conversion tools, scans the photograph to create a digitized copy of the photograph. The original photograph is then returned to the user, and the digitized copy is transferred over communication network 12 to archiving system 10, where it is stored on storage medium 16.

Figure 2:
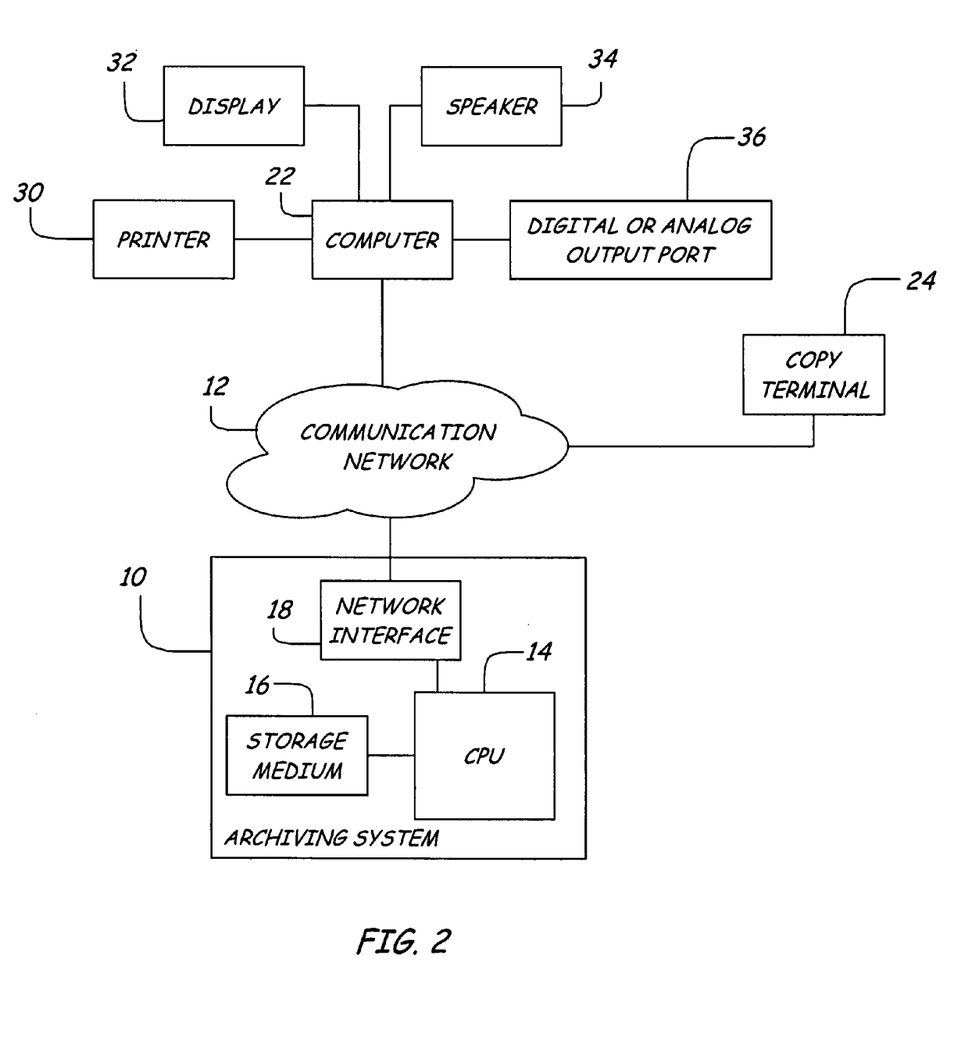
FIG. 2 is a block diagram of the archiving system, the network, and methods of accessing digital media stored in the archiving system.

FIG. 2 is a block diagram of archiving system 10, illustrating methods of reproducing digital media stored on storage medium 16. Archiving system 10, is connected to computer 22 and copy terminal 24 through communication network 12.

Once digital media has been stored in storage medium 16 of archiving system 10, various methods of accessing the digital media are provided. Computer 22 includes output devices, such as printer 30, display 32, speaker 34, and digital or analog output port 36, for reproducing the digital media stored on archiving system 10. In one embodiment, network interface 18 of archiving system 10 includes a web server that can be accessed through communication network 12. Computer 22 executes web browser software to access archiving system 10 through the web server. The web server transfers data to computer 22 to display a user interface on display 32 of computer 22.

Upon a request from computer 22, archiving system 10 transfers a copy of digital media stored on storage medium 16 to computer 22. The digital media can be printed, displayed, played, or output by computer 22 on printer 30, display 32, speaker 34, digital or analog output port 36, or other output means.

Copy terminal 24 is also capable of reproducing digital media stored on archiving system 10. For example, if a user wants a printed copy of a digitized photograph that is stored on archiving system 10, a copy can be made by copy terminal 24. One method of initiating the copy is through computer 22. While viewing the photograph on display 32 of computer 22, the user selects an option to request a printed copy of the photograph from archiving system 10. Archiving system 10 receives the request through communication network 12, and routes the request to copy terminal 24. Upon receipt of the request, the photograph is printed by copy terminal 24. The photograph is then mailed to the user or stored in a physical form at copy terminal 24 where it is available for pickup by the user.

Another method of generating the copy is to request the copy from copy terminal 24 directly. In this case, a user identifies the desired digital media and requests that a copy be made. For example, the user who viewed an image on computer 22 can record the unique media identifier associated with the image, and request that the digital media associated with that identifier be reproduced. Copy terminal 24 also includes a computer, which the user or service representative uses to locate the appropriate digital media on archiving system 10.

Copy terminal 24 includes various means of reproducing digital media stored on archiving system 10, including printers, compact disc burners, DVD burners, video recorders, etc. In addition, copy terminal 24 includes devices for generating novelty items such as by printing images on t-shirts, coffee mugs, calendars, etc.

Figure 3:
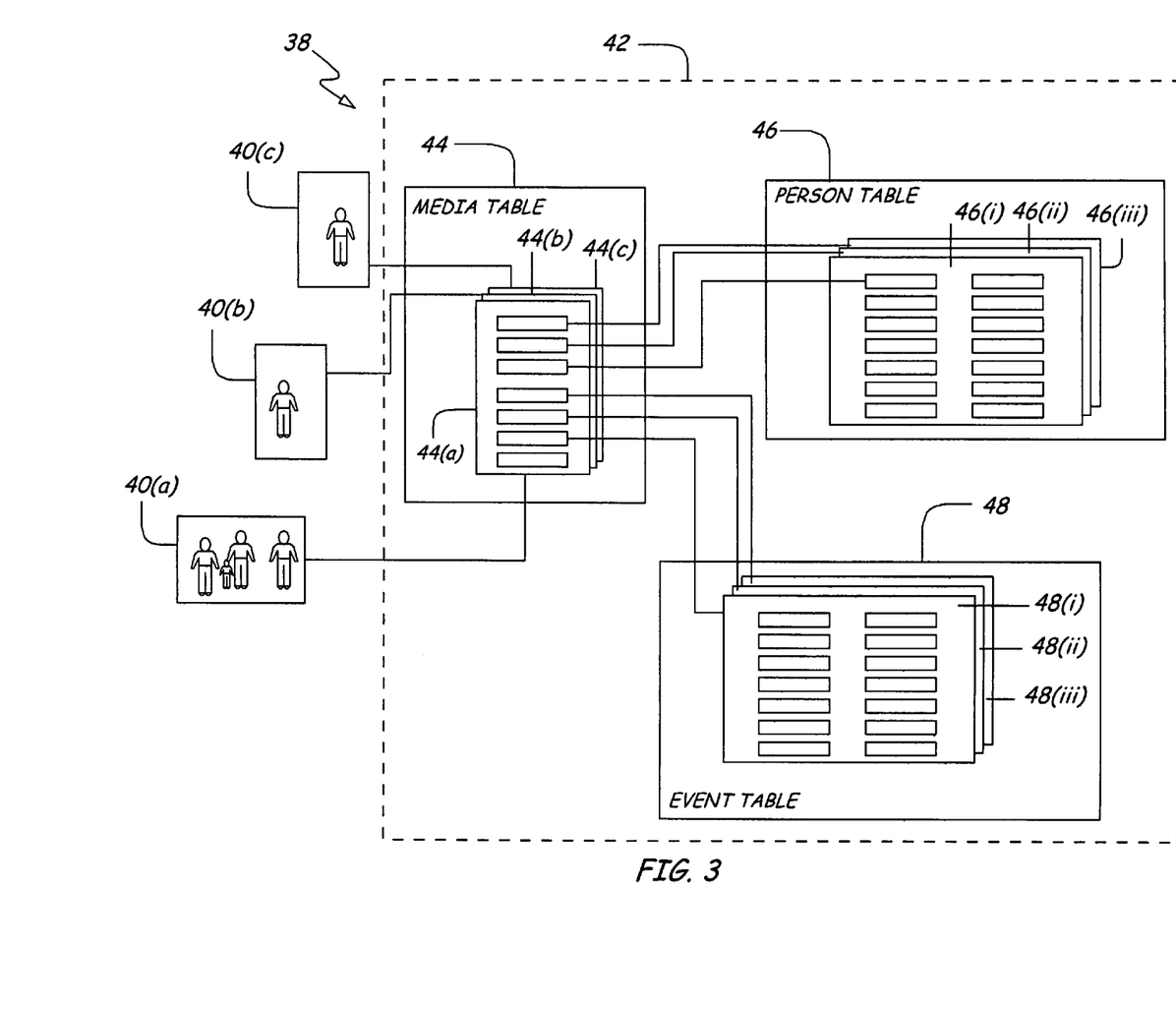
FIG. 3 is a block diagram of a relational database within the archiving system.

FIG. 3 is a block diagram of relational database 38 within archiving system 10. Relational database 38 includes digital media 40 including images 40(a-c), and contextual tables 42. Archiving system 10 not only stores digital media 40, but also a wide variety of contextual data relating to digital media 40. Contextual data is organized into contextual tables including media table 44, person table 46, and event table 48.

Media table 44 contains contextual data about digital media 40. Media table 44 consist of media records 44(a-c), that are each associated with one of digital media 40, such that there is a one-to-one relationship between digital media 40 and media records 44(a-c). For example, image 40(a) is associated with image record 44(a), image 40(b) is associated with image record 44(b), etc. Within image record 44(a) is contextual data relating to image 40(a), including date of initial data entry, name of person who entered data, date of photo, photographer, media purpose, media physical condition, media artistic quality, media rating, country, state, city, general event, specific event, subject, packaging notes, packaging date, processing number, names of people, other people, unusual object, and general remarks.

In this embodiment, media table 44 is a single table containing generic records for any type of media. In another embodiment, a plurality of different media tables could be used, where each media table is customized for a specific type of media. For example, a video recording table would be defined including video recording records. The video recording records would contain fields specific to that type of media, such as the length of the video recording, or the format of the original video recording. Other tables, such as image tables, document tables, sound recording tables, and others could also be defined having customized fields for the respective type of media.

Relational database 38 also stores additional contextual data in person table 46 and event table 48. Person table 46 consists of person records 46(i-iii), and includes data about the identity of people in or relating to digital media 40. For example, if image 40(a) is a photograph of a person, person record 46(i) would be generated for that person within person table 46. Person record 46(i) includes data about the person including names of parents, names of children, name of spouse, birth and death dates, anniversary date, place(s) of residence, career information, hobbies, general notes, and any other desired information.

Data relating to an event shown in digital media 40 is stored in event table 48. Event table 48 consists of event records 48(i-iii), that are generated by archiving system 10 to store data about the event shown in image 40(a). Event records, such as event record 48(i) includes data about the event, including name of event, beginning and ending dates, name of primary (or parent) event, name of sub-event, location, names of people involved in event, and any other desired information.

Relational database 38 stores the relationships between image 40(a) and records within contextual tables 44,46, and 48 by defining links between the media and the records of the tables. Links are defined by storing media or record identifiers within contextual tables 44,46, and 48. For example, image record 44(a) contains the unique media identifier for image 40(a), thereby defining a link between image record 44(a) and image 40(a). Image record 44(a) is linked with person record 44(i) of person table 46 and event record 48(i) of event table 48 by storing the unique record identifiers in the appropriate records. For example, image record 44(a) contains the unique person identifier for person record 46(i) and the unique event identifier for event record 48(i). Multiple links can also be defined if multiple relationships exist, for example if multiple people are in a photograph, or if a video recording shows multiple events. Links enable archiving system 10 to store complex relationships between people, places, things, and the media to which they relate. In this way archiving system 10 is able to quickly and easily find digital media or contextual data when requested by a user.

Archiving system 10 can also include an object table (not shown) for the storage of data relating to non-person objects in digital media 40. Objects may include pets, cars, places, or any other object. Object tables consist of object records that store data relating to the object and are linked with the appropriate image records of media table 44 in the same way as records of people table 46 and event table 48, described above.

Many types of digital media can be stored in archiving system 10. Media of historical significance can take many forms, including both physical (photographs, newspaper articles, printed records or documents) and non-physical (digital media, stories, and memories). As a result, digital media 40 stored within archiving system 10 can also take on many forms. Therefore, archiving system 10 provides a comprehensive and complete storage solution for all family media and memories.

Figure 4:
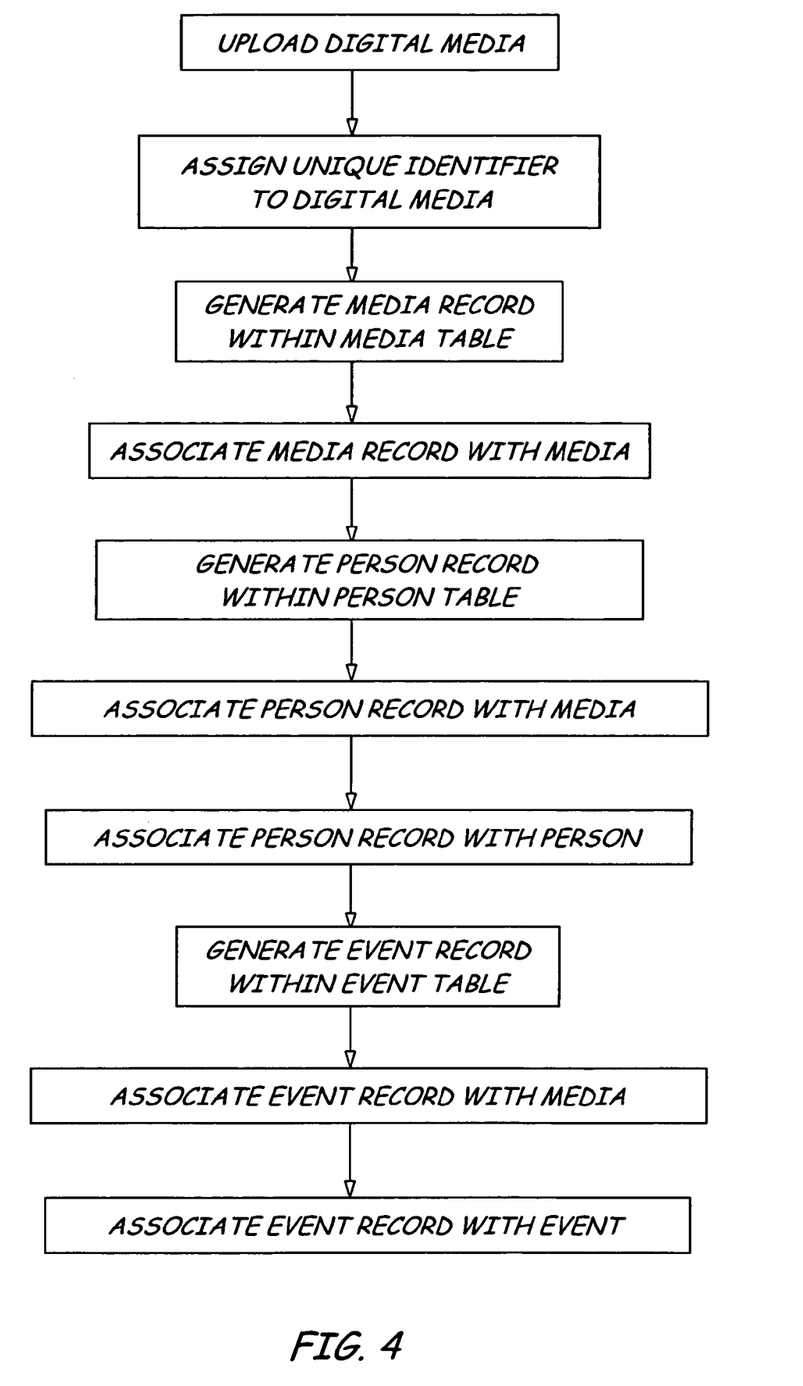
FIG. 4 is a flow chart illustrating how contextual data is stored and organized within the relational database of archiving system.

FIG. 4 is a flow chart illustrating how contextual data is stored and organized within relational database 38 in storage medium 16 of archiving system 10. Archiving system 10 begins by receiving digital media 40, such as image 40(*a*) (step 50) through network interface 18. As described with reference to FIG. 1, digital media 40 can be generated by a number of sources, and then uploaded to archiving system 10 by computers 20 or 22 or copy terminal 24 through communication network 12. Archiving system 10 receives image 40(*a*), and stores it in storage medium 16. Archiving system 10 then assigns a unique media identifier (step 52) to image 40(*a*). The unique media identifier is any numeric or alpha-numeric code, and is used to reference image 40(*a*) within contextual tables 42.

Once digital media 40 has been received and assigned a unique media identifier (steps 50 and 52), archiving system 10 generates the appropriate records within contextual tables 42, including media record 44(*a*) (step 54), person record 46(*i*) (step 58), and event record 48(*i*) (step 64), for the storage of contextual data relating to image 40(*a*).

Media record 44(*a*) is generated by archiving system 10 to store data relating to image 40(*a*). Next, archiving system 10 associates image record 44(*a*) with image 40(*a*) (step 56) by storing the unique media identifier for image 40(*a*) within an image field of image record 44(*a*) to define a link between image record 44(*a*) and image 40(*a*). Each uploaded digital media 40 is assigned to its own media record within media table 44, which stores data relating to that specific digital media 40.

All uploaded digital media 40 is related in some way to one or more people. As a result, archiving system 10 generates one or more person records 46(*i-iii*) within a second contextual table 42, known as person table 46 (step 58). The generation of person records 46(*i-iii*) is performed after the user has provided the names of the people in digital media 40. Multiple person records 46(*i-iii*) can be generated if image 40(*a*) is related to more than one person. Each person record 46(*i-iii*) contains data pertaining to a single individual, and is identified by a unique person identifier. The identifier is any numerical or alpha-numeric code, such as "Person0245." Person record 46(*i*) is associated with the person by storing the unique person identifier in person record 46(*i*) (step 60).

Person record 46(*i*) is then associated with image 40(*a*) and image record 44(*a*) (step 62). To do so, the name of the person in image 40(*a*) is stored within image record 44(*a*). Thus, a link is identified from image 40(*a*) to the person in the image.

Records in person table 46 not only includes the identity of an individual, but also other information about the person. For example, person records 46(*i-iii*) includes fields for names of parents, name of spouse, names of children, birth and death dates, places of residence, career information, and any other desired information. In addition, person table 46 includes fields for more complex family structures including step-parents and marriage complications.

Although some digital media 40 will not include a person directly, all digital media 40 have some relation to one or more people. For example, a photograph of a mountain, though including no people directly, is related to the people who took the photograph, such as during their vacation. Similarly, printed records will also have some relation to one or more people, and can therefore be linked with the person table 46 associated with those people.

Additional contextual data is stored by archiving system 10 within event table 48. Archiving system 10 generates event records 48(*i-iii*) within event table 48 (step 64) to store data relating to the events depicted or relating to digital media 40. Generation of event records 48(*i-iii*) occurs after a user has entered a name of the event relating to digital media 40. Events can be defined broadly or narrowly. For example, an event can be defined for an entire three month trip around the world, or for very specific activities, such as blowing out the candles at a birthday party. In addition, events can include various sub-events.

Event records 48(*i-iii*) within event table 48 include fields for primary events, sub-events, beginning and ending dates, locations, people involved in the event, etc. Each event record, such as event record 48(*i*) is assigned a unique event identifier, such as "Event0099" that is used to identify the event record within relational database 38. To associate event record 48(*i*) with the event (step 66), the unique event identifier is stored in event record 48(*i*).

A link is then defined between the event table and digital media 40, to associate event record 48(*i*) with image record 44(*a*) (step 68). The unique event identifier is stored in image record 44(*a*) to identify the event depicted in image 40(*a*).

Sub-events can also be generated for each event. To do so, archiving system 10 generates an additional event record, such as event record 48(*ii*) for each sub-event. The sub-event record 48(*ii*) is assigned a unique event identifier. The unique event identifier for the sub-event is also stored within one of the sub-event fields of the primary event record 48(*i*). The unique event identifier of the primary event record 48(*i*) is stored in a parent field of the sub-event record 48(*ii*). For example, a photograph of a jam session during the Forth of July celebration in Fort Madison Iowa in 1970 is uploaded to archiving system 10, which generates image record 44(*a*) and person record 46(*i*). Event record 48(*i*) is generated for the primary event "Fourth of July Celebration" and the date and location are stored within that table. A second event record 48(*ii*) is also generated for the "jam session" at Dick and Rose Rump's house in Fort Madison. The primary event and secondary event are associated with each other by storing the unique identifiers in the appropriate fields of event table 48.

Figure 5:
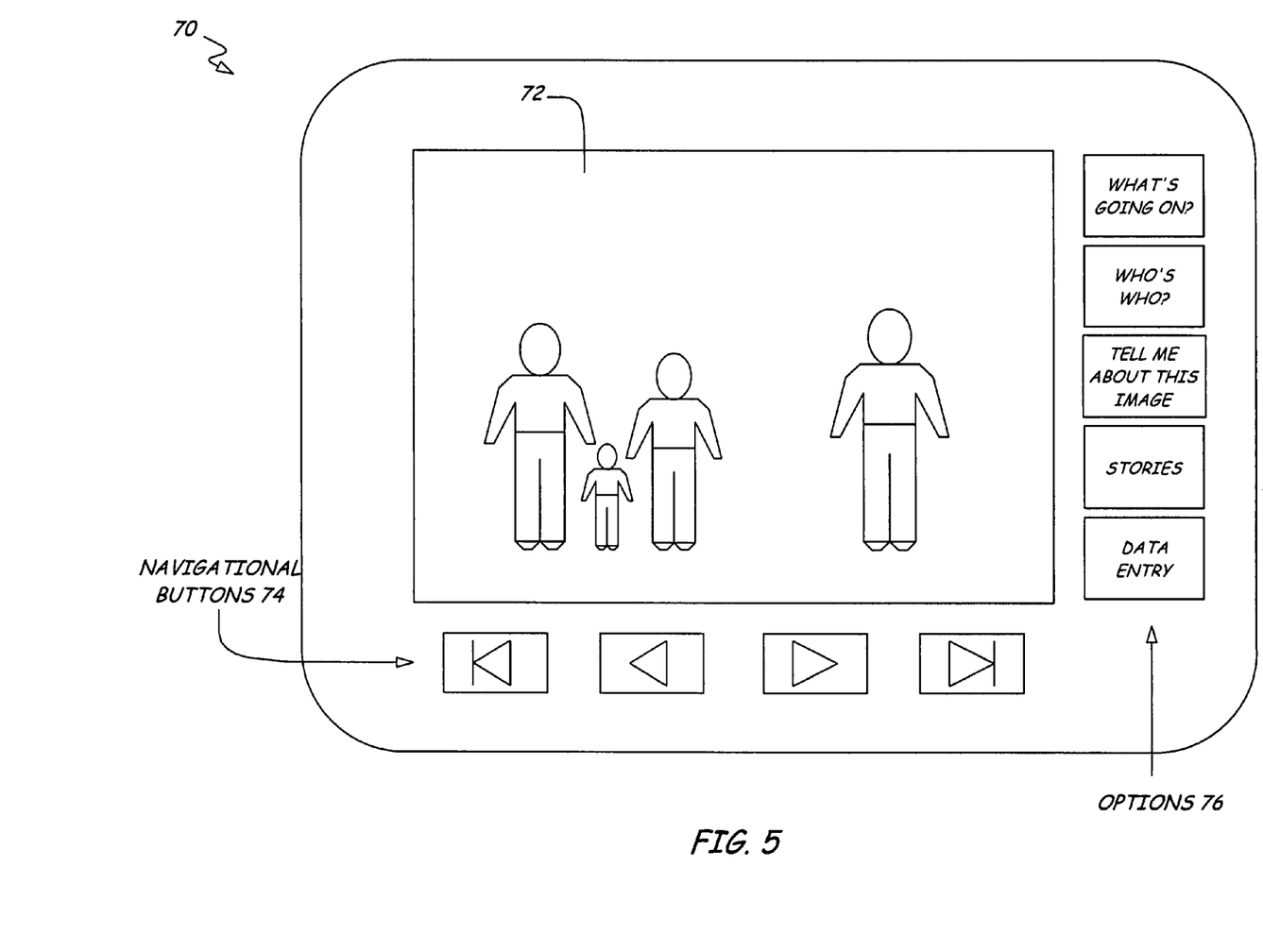
FIG. 5 is a screen shot of a user interface for accessing digital media and contextual data stored in the archiving system.

FIG. 5 is a screen shot of user interface 70 displayed on display 32 of computer 22. In one embodiment, user interface 70 is an Internet web page displayed by a browser operating on computer 22. The web page data is transferred from archiving system 10 to computer 22 across communication network 12. In another embodiment, user interface 70 is a computer program executing on computer 22, that retrieves data from archiving system 10 across communication network 12.

User interface 70 is a graphical user interface though which a user can access digital media 40 from archiving system 10 and contextual data relating to the digital media 40. In addition, user interface 70 assists users in adding additional digital media 40, or additional contextual data.

User interface 70 includes digital image 72, navigational buttons 74 and contextual options 76. Other forms of media, besides image 72, could also be displayed on user interface 70. Navigational buttons 74 allow the user to browse through digital media 40 stored in archiving system 10 by going to the previous or next image or jumping to the first or last image in a series. Contextual options 76 allow the user to explore contextual data relating to digital image 72, or enter additional contextual data. For example, contextual options provide contextual data relating to digital image 72 such as specific details about the digital image (from media table 44), information about the people in the digital image (from person table 46), and a description of the event the picture is associated with (from event table 48). Contextual options 76 also includes a data entry option. If the user knows something about the digital image, such as the names of the people in it, the event involved, or a story relating to the digital image, they can enter that information by selecting the data entry wizard from options 76.

Often when a user is browsing through the data stored in archiving system 10, the digital media or other information will remind the user of other memories. User interface 70 makes it easy to describe the memories, by either typing in data (by selecting the data entry wizard) or by verbally telling the story (by selecting the stories wizard from options 76).

To type in data, the user selects the data entry wizard. User interface 70 then prompts the user for the type of data they would like to enter. The types of data may include a description of the image, the identities of the people, a description of the event, general comments or notes, or any other information. The user then selects the appropriate option and enters the contextual data.

If the user wants to tell a story related to the event, a digital recording program wizard is initiated, such as on computer 22. The digital recording program receives an input from either a microphone or a video camera to record the person telling the story relating to the media User interface 70 displays recording control options (such as record, stop, rewind, fast forward, and playback) that enable the user to control the digital recording process. Once the recording is complete, it is transferred to archiving system 10 and stored in storage medium 16, as described above.

If the user desires to identify the people in the digital image, user interface 70 initiates a software wizard that assists the user through each step of the process. First, user interface 70 prompts the user to click on the person they wish to identify. The user then moves the cursor to one of the people in the digital image and clicks on that person. User interface 70 then prompts the user to select the name of the person from a list of people, or to enter a new name. The list of people is generated from the names of people stored in person table 46. User interface 70 prompts the user to continue identifying people until all people in the digital image have been identified, or until the user no longer knows the identities of any additional people. Once complete, user interface 70 transfers the name of the person(s) and the location(s) in the digital image (such as pixel coordinates) to archiving system 10, which creates the tables and links to store the contextual data relating to digital image 72, as described above. The new data is then immediately available to others who access the data in archiving system 10. For example, when a user selects the who's who option (shown in FIG. 5), user interface 70 displays the names of the identified people. Contextual data about each person (stored in person table 46) can be accessed by selecting a person or the name of the person.

Archiving system 10 enables many people to participate in the process of recording and documenting family history. Because many families have accumulated a great amount of information about past and present family members, the task of recording and documenting could be quite overwhelming. Archiving system 10, however, allows many people to participate in the process at the same time, thereby greatly reducing the amount of time needed. Each family member can access archiving system 10 on their own computer (such as computers 20 and 22) across network 12.

Archiving system 10 can be configured to place limitations on who can access data stored within archiving system 10, or restrict certain activities to certain individuals. Some families will prefer not to have all information entered into archiving system 10 made available to extended family, but would rather have it limited to immediate family members or those who have received their permission. As a result, archiving system 10 includes administration capabilities, where a user can select who can access the information, how much they can access, and what they can do.

In one embodiment, archiving system 10 defines four access levels: super administrator, administrator, family member, or viewer. A super administrator has complete access to data and information stored within archiving system 10. Super administrator privileges may be limited to those in charge of operating archiving system 10, such as the web server operator. Administrators are able to invite people, remove people, and assign privileges to other users, as well as view and edit all data stored within archiving system 10. Family members are given complete read and write access, but are not allowed to invite others or assign privileges. Viewers are given read-only access to the data on archiving system 10 and cannot add any additional information or modify any of the information without being upgraded to a family member. Users that are not given one of these four access privileges are not able to view or edit any of the family's digital media 40 or contextual data In this way, users can be confident that information entered into archiving system 10 will only be read and viewed by those with permission to do so.

Archiving system 10 provides searching and report generation features to allow users to easily find and access desired digital media 40 and contextual data. Search options include basic searches, such as keyword searches, and more advanced searches to search within specific fields of data with specified criteria Search results can be stored within archiving system 10 or sent to another user, and can be filtered or refined as desired.

Users can use archiving system 10 to generate reports that can be printed or stored on archiving system 10. Reports include timelines, family trees, or custom reports. Timelines show events for a specific person or group of people over a period of time in a chronological order. Family trees show the relationships between family members over various generations. Custom reports include digital media 40 or contextual data configured in whatever manner the user desires.

Although the present invention has been described with reference to preferred embodiments, workers skilled in the art will recognize that changes may be made in form and detail without departing from the spirit and scope of the invention.

The invention claimed is:

1. A system for archiving family history comprising:
    a storage medium for storage of digital media and contextual data relating to the digital media;
    a network interface for communicating the digital media and contextual data over a network; and
    a control processor operating a relational database for organizing the contextual data by arranging the contextual data into media, person, and event records within corresponding contextual tables to archive a family history, the contextual tables comprising:
        a media table, stored in the storage medium, for storing media records relating to the digital media;
        a person table, stored in the storage medium, for storing person records relating to the digital media; and
        an event table, stored in the storage medium, for storing event records relating to the digital media.

2. The system of claim 1, wherein the network interface further comprises a web server for transmitting web page data for generation of a web page, wherein the web server transmits the digital media and contextual data relating to the digital media along with the transmission of web page data.

3. The system of claim 2, wherein the web server receives contextual data relating to the digital media, and wherein the control processor organizes received contextual data to archive a family history by arranging the contextual data into media, person, and event records stored within corresponding contextual tables in the storage medium.

4. The system of claim 1, further comprising a copy terminal to generate the digital media from non-digital media, wherein the copy terminal is connected to the network for communicating the digital media for storage within the storage medium.

5. The system of claim 1, wherein the media record contains a unique media identifier representative of the digital media.

6. A method of archiving family history, the method comprising:
    receiving digital media through a network interface;
    storing the digital media in a storage medium;
    storing contextual data, arranged in contextual tables, on the storage medium to archive a family history by generating a media record within a media table for storing data relating to the digital media, generating an event record within an event table for storing event data relating to the digital media, and generating a person record within an person table for storing person data relating to the digital media; and
    transmitting a portion of the digital media and the contextual data though the network interface in response to a request received through the network interface.

7. The method of claim 6, further comprising:
    generating an object record within an object table for storing object data relating to the digital media.

8. The method of claim 6, further comprising transmitting web page data along with the digital media and configuration data.

9. The method of claim 6, wherein the digital media is a digital image.

10. The method of claim 6, wherein the digital media is an electronic document.

11. The method of claim 6, wherein the digital media is a digital audio recording.

12. The method of claim 6, wherein the digital media is a digital video recording.

13. The method of claim 6, further comprising:
    transmitting data for generating a user interface to display the digital media and the contextual data.

14. A method of receiving contextual data from a user relating to a digital image, the method comprising:
    displaying a digital image on a computer screen;
    displaying a first set of options on a computer screen;
    receiving a first input indicating that the user would like to enter data relating to the digital image;
    displaying a second set of options relating to the type of data that can be input relating to the digital image;
    receiving a second input indicating that the user would like to provide data relating to an event to which the digital image pertains;
    displaying a message requesting data relating to the event to which the digital image pertains;
    receiving a third input including data relating to the event to which the digital image pertains; and
    associating the data with the digital image to archive a family history by creating an event record within an event table for storing event data relating to the digital media.

15. A method of archiving family history, the method comprising:
    receiving digital media through a network interface;
    storing the digital media in a storage medium;
    generating a unique media identifier;
    associating the unique media identifier with the digital media;
    generating a media record within a media table for storing data relating to the digital media;
    associating the media record with the digital media;
    generating an event record within an event table for storing event data relating to the digital media;
    generating a unique event identifier;
    associating the unique event identifier with the event record and with the media record;
    generating a person record within a person table for storing person data relating to the digital media;
    generating a unique person identifier; and
    associating the unique person identifier with the person record and with the media record to archive a family history.

16. The system of claim 1, wherein the person table contains lineage and familial relations between individual person records.

17. The method of claim 6, wherein the person table contains a lineage and familial relations between individual person records.

18. The method of claim 6, further comprising:
    receiving additional contextual data relating to the digital media through the network interface, and organizing the additional contextual data by arranging the contextual data into media, person, and event records stored within corresponding contextual tables to archive a collaborative family history.

19. A method of archiving family history, the method comprising:
    providing access to family members through a network interface, by which family members can view digital media and contextual data relating to family history and add digital media and contextual data relating to images, people, events, sounds, documents, and stories; and
    organizing the contextual data into media, person, and event records within corresponding contextual tables to provide a relational database that archives the family history so that it is accessible by the family members through the network interface.

* * * * *